United States Patent [19]

Kelland

[11] Patent Number: 5,444,793
[45] Date of Patent: Aug. 22, 1995

[54] METHOD FOR DETECTING MACHINE PRINTED MONETARY AMOUNTS IN BINARY IMAGES

[75] Inventor: Stewart B. Kelland, Waterloo, Canada

[73] Assignee: NCR Corporation, Dayton, Ohio

[21] Appl. No.: 77,692

[22] Filed: Jun. 15, 1993

[51] Int. Cl.⁶ .............................................. G06K 9/00
[52] U.S. Cl. ..................... 382/138; 382/173; 382/224
[58] Field of Search ............... 382/7, 9, 40, 48, 36–39; 235/379, 437, 493

[56] References Cited

U.S. PATENT DOCUMENTS

| | | | |
|---|---|---|---|
| 4,034,210 | 7/1977 | Hill et al. | 235/61.12 N |
| 4,131,879 | 12/1978 | Ehrat | 340/146.3 H |
| 4,172,552 | 10/1979 | Case et al. | 235/380 |
| 4,564,752 | 1/1986 | Lepic et al. | 235/437 |
| 4,680,803 | 7/1987 | Dilella | 382/9 |
| 4,685,141 | 8/1987 | Hoque et al. | 382/7 |
| 4,745,265 | 5/1988 | Douno et al. | 235/379 |
| 4,811,412 | 3/1989 | Katsurada | 382/9 |
| 4,817,186 | 3/1989 | Goolsbey et al. | 382/7 |
| 4,901,365 | 2/1990 | Kelland | 382/61 |
| 4,903,312 | 2/1990 | Sato | 382/21 |
| 4,903,313 | 2/1990 | Tachikawa | 382/27 |
| 5,053,607 | 10/1991 | Carlson et al. | 235/379 |
| 5,079,546 | 4/1992 | Hyakutake | 340/750 |
| 5,119,433 | 6/1992 | Will | 382/7 |
| 5,151,948 | 9/1992 | Lyke et al. | 382/7 |
| 5,193,121 | 3/1993 | Eliseher et al. | 382/7 |
| 5,208,869 | 5/1993 | Holt | 382/7 |

FOREIGN PATENT DOCUMENTS

| | | |
|---|---|---|
| 0054439 | 6/1982 | European Pat. Off. |
| 88/02157 | 3/1988 | WIPO |
| 92/06447 | 4/1992 | WIPO |

*Primary Examiner*—Joseph Mancuso
*Attorney, Agent, or Firm*—Elmer Wargo

[57] ABSTRACT

A method of locating a monetary amount in a binary image, with a binary 1 representing a black pixel and a binary 0 representing a white pixel. An examining window is positioned over a portion of the binary image and a list of objects is generated, with an object being defined as a set of contiguous black pixels. The objects are classified into classes of parts depending on predetermined criteria. The classes of parts are then examined to determine whether or not they fit into a certain sequence which is indicative of a monetary amount. For example, for US currency, one sequence is "character, dot, character, character" which might stand for $2.46. The next step is to examine the classes of parts to determine whether or not they conform to certain geometric criteria to be indicative of a monetary amount. At this time, the classes of parts within the window may indicate that a monetary amount is present; however, a subsequent character recognition operation would have to be performed to determine what the individual characters are. The window is moved to a next portion of data, and the process described is repeated.

8 Claims, 5 Drawing Sheets

```
         0 • *
       4 3 6 • 0 0 +
WINDOW 42 ─→ 2̶ 1̶ 8̶ •̶ 0̶ 0̶ +̶
       2 4 6 • 0 0 +
       5̶ 1̶ 7̶ •̶ 0̶ 0̶ +̶
           7 • 0 0 +
         1 7 • 2 5 +
       1 8 0 • 0 0 +
       2 2 0 • 0 0 +
         1 4 • 9 6 +
         3 0 • 0 0 +
       1 1 0 • 0 0 +
         3 1 • 0 0 +
       2 5 5 • 7 3 +
       6 1 8 • 8 8 +
           5 • 0 0 +
     2 9 0 7 • 5 5 ◊

2 9 0 7 • 5 5 *
```

METHOD FOR DETECTING MACHINE PRINTED MONETARY AMOUNTS IN BINARY IMAGES

BACKGROUND OF THE INVENTION

1. Field of Invention

This invention relates to digital image processing, and in particular, it relates to detecting machine printed monetary amounts, like a dollar amount, for example, in binary images.

2. Background Information

In recent years, there has been an increased effort towards processing information or data on documents by using images of the documents instead of using the documents themselves. The images are usually generated by providing relative movement between the document being scanned and a scanning device which generates a plurality of picture elements or pixels in a scanning line. Successive scanning lines of such pixels generate an array of pixels for the area imaged. The pixels are usually thresholded to generate binary data with each pixel being a binary 1 or a binary 0, with the binary 1 representing the presence of data, for example, and the binary 0 representing the absence of data. Such an array is called a binary bit-mapped image.

Images of business documents, for example, often contain fields in which machine printed monetary amounts are located. These fields may be isolated, or they may form a part of lists or columns of the monetary amounts. In those situations in which the location of the monetary amounts within the bit-mapped image is not known, it is usually difficult to find the monetary amounts.

SUMMARY OF THE INVENTION

An object of this invention is to provide a simple and economical method and system for finding the location of a monetary amount within a binary bit-mapped image.

Another object of this invention is to find the location of the monetary amount without having to depend upon the recognition of specific characters.

In a first aspect of this invention, there is provided a machine method of locating a monetary amount in a binary image of a document comprising the steps of:

(a) positioning a window of a predetermined size over a portion of said binary image, with a binary 1 or black pixel representing the presence of data and a binary 0 or white pixel representing the absence of data;

(b) generating a list of objects within said window, with an object defined as a set of contiguous black pixels;

(c) processing said objects according to predetermined criteria to generate classified parts to determine whether or not the classified parts fit into a pattern indicative of a monetary amount without performing character recognition on the classified parts; and (d) using said pattern indicative of a monetary amount, when found, to indicate the presence of a monetary amount providing the associated classified parts conform to certain geometric criteria;

In a second aspect of this invention, there is provided a machine method of locating a monetary amount in a binary image of a document comprising the steps of:

(a) positioning a window of a predetermined size over a portion of said binary image, with a binary 1 or black pixel representing the presence of data and a binary 0 or white pixel representing the absence of data;

(b) generating a list of objects within said window, with an object defined as a set of contiguous black pixels;

(c) classifying said objects into classes of parts according to predetermined criteria;

(d) examining said classes of parts to determine whether or not the classes of parts fit into a certain sequence which is indicative of a monetary amount; and (e) examining said classes of parts when said certain sequence is found in step (d) to determine whether or not the sizes of said classes of parts are within predetermined parameters to be indicative of a monetary amount.

The method of the present invention is selective in that it seldom detects a "monetary amount" in an image of the document when the image does not contain one.

This method is relatively insensitive to extraneous items in the image which may surround a machine printed monetary amount.

This method works even if the image of the monetary amount is of a poor quality, and the characters are broken into disconnected pieces.

This method also detects machine printed monetary amounts with and without commas and decimal points.

The above advantages, and others, will be more readily understood in connection with the following specification, claims, and drawing.

BRIEF DESCRIPTION OF THE DRAWING

FIGS. 6-1 and 6-2, taken together, show the general steps associated with the method of this invention.

DETAILED DESCRIPTION OF THE PREFERRED EMBODIMENT

Figure 1:
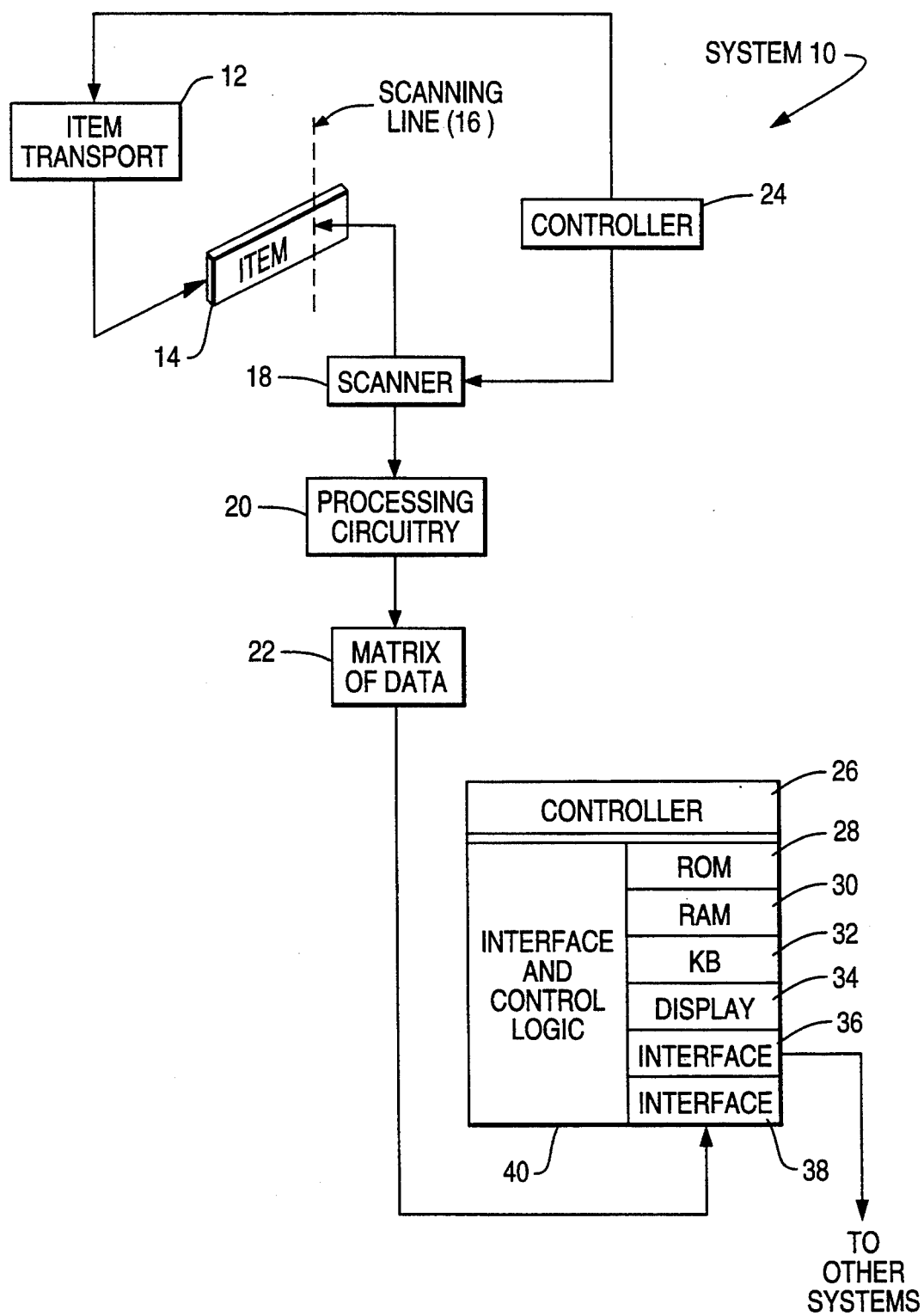
FIG. 1 is a general schematic diagram showing an apparatus which may be used in carrying out the method of this invention.

As previously stated, this invention relates to a method of detecting machine printed dollar amounts in binary bit-mapped images. FIG. 1 shows a schematic diagram of an apparatus or system 10 which includes an item transport 12 which moves an item, like a document 14, towards a scanning line 16 where the document 14 is imaged by a scanner 18 as is conventionally done. The scanner 18 produces successive scan lines or columns of pixel data or pixels as the item 14 is moved in reading relationship therewith. The scanner 18 could also be a hand held scanner, for example, which is moved over a stationary document to effect the reading. From the scanner 18, the successive columns of pixel data are processed to minimize noise associated with the pixels and to threshold the pixels into a binary "1", for example, which may represent the presence of data and a binary "0" which may represent the absence of data. This processing is effected by conventional circuitry shown only as processing circuitry 20.

The output of the processing circuitry 20 is a matrix 22 of binary data or pixels (not compressed) which corresponds to the image of the associated document 14. Naturally, one may start out with the matrix 22 of binary data as derived from some other system (not shown) in order to practice the present invention. The matrix 22 of binary data may include about 1700 pixels per column with a resolution of about 200 pixels per inch, for example, as just one illustration of a document whose width is about 8½ inches wide. Naturally, the overall size of the matrix 22 of data is dependent upon a particular application; however, the particular size is not important to an understanding of this invention nor the operation thereof. The scanner 18 and the item transport 12 may be controlled by a separate controller 24, for example, or they may be controlled by the controller 26 which is used to process the matrix 22 of data or pixels.

The controller 26 (FIG. 1) is a conventional controller which may be used to process the matrix 22 of data according to this invention. The controller 26 includes a read only memory (ROM 28), a random access memory (RAM 30), a keyboard (KB 32), a display 34, interfaces 36 and 38, and interface and control logic 40 which is used to interconnect all the components shown in a conventional manner. The form of the controller 26 shown is used to facilitate a discussion of the operation of the controller 26; the actual form of the controller 26 is different from that shown.

Before proceeding with a discussion of this invention, it appears appropriate to define certain terms used in this application.

A pixel is a picture element. It represents the state of a picture or image at a particular location.

A binary pixel can represent one of two states: black or white.

A binary image is a two dimensional array of binary pixels.

An object is a contiguous set of black pixels. In this case, contiguity is based on each pixel being adjacent to eight neighbors. See FIG. 2 which shows a center pixel 40 which is a dark or binary 1 and eight surrounding pixels which are white or binary 0s in the example being described. The center pixel 40 is considered an "object" in the example being discussed. In other words, for a binary 1 pixel 40 under consideration, only one of the eight surrounding pixels need be a binary 1 in order to have contiguity with the pixel 40; these two black pixels then constitute an "object."

A part is a collection of objects. A minimum "object" includes a single black pixel. The black pixels could be considered as "foreground", while the white pixels are considered "background."

A window is a rectangular portion of a binary image. See FIG. 3 for a window 42 surrounding a monetary amount of 246.00. Because this invention relates to processing machine printed characters, the approximate size of the characters is known, and the size of the window 42 is designed so that it is unlikely that it will accommodate more than one completed dollar amount in the example being described.

Figures 2, 3:
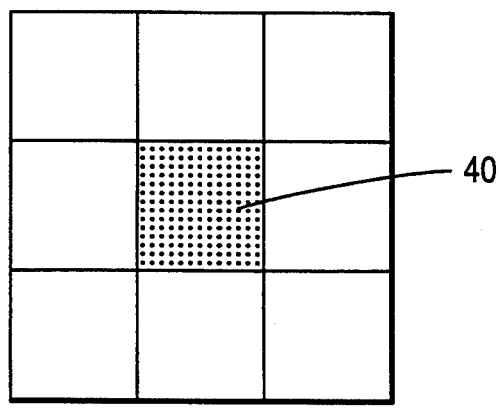
FIG. 2 is a schematic diagram showing a central pixel and its surrounding pixels.
FIG. 3 is a schematic diagram showing a window surrounding certain data in a binary image of a document.

FIG. 3 shows the image of an adding machine tape on which a plurality of numerical figures have been entered. Because the size of the printing is known, the size of the window 42 is selected so that it covers or embraces essentially one complete line of data as stated.

The first stage in this method is to generate a list 43 (FIG. 6-1) of the objects within the window 42. This list 43 includes the image coordinates of the top, bottom, left, and right sides for each object in the window. It should be recalled that an object as defined herein is a contiguous set of black pixels. In general, the objects are classified into "parts", to create a list 43 of parts as will be described hereinafter.

A second stage of this method is to search through the list 43 of "parts" to look for certain sequences of parts. In the example being described for a monetary amount appearing (from left to right) as "dollars", the sequence of the classes of parts is:
character, dot, character, character;
character, gap, character, character.

Ideally, this sequence corresponds to a dollar digit followed by a decimal point or gap followed by two digits for cents, like $8.28. If the search fails to find any of the two sequences mentioned above, the method is terminated with a negative result. If the search detects such a sequence as mentioned above, then the search is successful, and the rightmost character in the sequence is considered the rightmost character in the potential monetary amount. Any other character parts located to the right of the "rightmost character" are discarded, while all other character parts to the left of the "rightmost character" are considered characters in the monetary amount.

A third stage in this method is to check the vertical regularity of the character parts within the potential monetary amount to determine if they conform to certain geometric criteria. In general, the heights of the character parts are examined to determine whether or not the heights are within expected norms or parameters for the machine characters being examined. If the requirements are not met, the method terminates with a negative result for the "character parts" within the window 42. If the examination terminates with a positive result, it means that a machine printed dollar amount has been detected. When so detected, the coordinates of the top, bottom, left, and right sides of the smallest rectangle which encloses the machine printed dollar amount are recorded on the list 43. At this time, it should be noted that the character parts are in the right sequence for a monetary amount; however, the characters have not been identified as to what they represent. A subsequent character recognition operation would be performed on the character parts within the rectangle to ascertain the actual monetary amount.

As alluded to earlier herein, a list 43 of objects within a window is sorted or classified into one of the following five classes of parts. Recall that a "part" is a collection of objects. The classes are:
P-1 character—roughly the right size for a character.
P-2 dot—roughly the right size for a decimal point.
P-3 comma—roughly the right size for a comma.
P-4 gap—contains no objects but indicates a horizontal space between parts.
P-5 piece—none of the above.

As stated earlier herein, the objects which appear in image data appear in a list 43. The list 43 may be stored in the RAM 30 of the controller 26 shown in FIG. 1. The objects are classified (P-1 through P-5) according to the order in which they are listed on the list 43. The most recently created part is the current part; initially there is no current part. A subsequent example will make this designation clearer.

Figure 4:
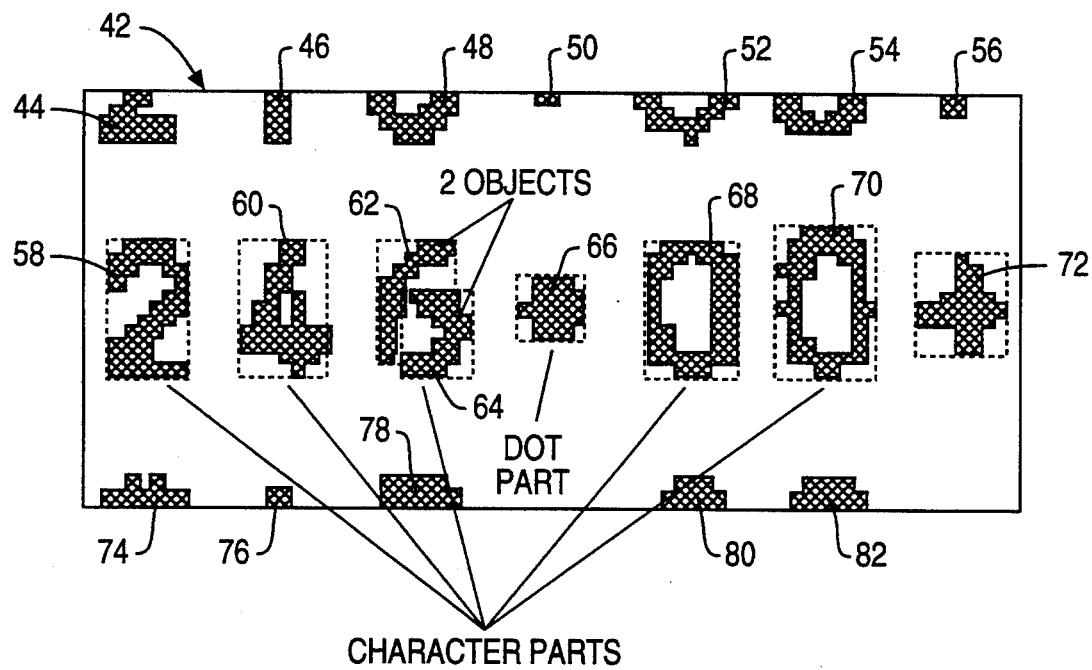
FIG. 4 is an enlarged view of the window shown in FIG. 3.

FIG. 4 shows an enlarged view of the window 42 shown in FIG. 3, with these objects appearing as image data in this window. The first stage in this method is to classify the objects into the classes of parts represented by P-1 through P-5 enumerated above. In order to do the classifying, a Classifying Program, shown by the general steps C-1 through C-18, is included hereinafter. The Classifying Program is written in pseudo code.

| C-1 | if | x touches the top or bottom of window 42 |
|---|---|---|
| C-2 | then | remove x from list 43 |
| C-3 | else if | x overlaps horizontally with current part |
| C-4 | then | add x to the current part and reclassify part |
| C-5 | else if | height of x is greater than comma |
| C-6 | then | |
| C-9 | { | |
| C-10 | if | horizontal gap between x and current part is large enough |
| C-11 | then | create new part of type gap |
| C-12 | | create new part of type character |
| C-13 | } | |
| C-14 | else if | x is right size for a dot |
| C-15 | then | create new part of type dot |
| C-16 | else if | x is right side for a comma |
| C-17 | then | create new part of type comma |
| C-18 | else | create new part of type piece |

Assume that the collection of objects in the window 42 is to be examined starting with the object 44 shown in FIG. 4. The first step (C-1) in the Classifying Program (hereinafter referred to as Cl Pr) states that if x touches the top or bottom of window 42, then, remove x from the list 43. In this instance, x refers to the object 44, and because object 44 touches the top of the window 42, this object is removed from the list 43 because it is potentially less than a full character. The examination is continued for the next object in the list 43, which in the example being described, is the object 46. Because object 46 also touches the top of the window 42, it is also removed from the list 43. Similar iterations are used to remove objects 48, 50, 52, 54, and 56 from the list 43 because these objects also touch the top of the window 42.

The next object to be examined for the classification of parts, is the object "2" which is also referenced by the numeral 58 in FIG. 4. In this current example being discussed, there is as yet, no "current part" because all the objects like 48 and 56, for example, were removed from the list 43 for the reasons stated. Because the object 2 does not touch the top of the window 42, the Cl Pr proceeds to step C-3. At this step C-3, x does not overlap horizontally with the current part (because there is none at this time), and consequently, the Cl Pr proceeds to step C-4. At step C-4, x is added to the current part, and now object "2" is reclassified as the current part. At step C-5, because object "2" is greater than a comma, the process continues to steps C-9 through C-13. A new part (P-1) or character is created for this part at step C-12. The remaining steps C-14 through C-18 do not apply for object "2".

The next object to be examined in the window 42 in FIG. 4 is the object 60 which represents the number "4". Because object 60 does not touch the top or bottom of the window 42, steps C-1 through C-2 do not apply. At step C-3, x or object 60 is examined to determine if it overlaps with the current part or object 58 in the example being described. The overlapping is determined by the coordinates of the various objects appearing on the list 43. Because the object 60 does not overlap the current part 58, object 60 now is reclassified as the "current" part at step C-4. As part of the classifying, at step C-5 the height of object 60 is evaluated to determine whether or not its size is greater than a comma. By knowing the predetermined size of the machine printed characters in the example being described, the Cl Pr determines whether or not the size of the object 60 is greater than a comma. If it is, the Cl Pr proceeds to steps C9 through C-13. At C-12, object 60 is classified as a new part (P-1) which is roughly the right size for a character. The symbols at steps C-9 and C-13 simply mean, "when processing, perform all the steps between these symbols."

Proceeding with the example being discussed, the next objects to be considered are the separate objects 62 and 64 which together form the character "6". Object 62 forms the left part of the character 6 and object 64 forms the right part of the character. Because the examination has been proceeding from left to right in the example being described, the next object to be examined is object 62. Object 62 does not touch the top or the bottom of the window 42, and consequently, the examination proceeds to step C-3. Because the object 62 does not overlap with the current part (object 60), object 62 or the left part of the "6" becomes the current part. From step C-5, the object 62 is greater than a comma, therefor, the Cl Pr proceeds to step C-9 through C-13. A new part of type character (P-1) is created at step C-12. Notice that at this time, the Cl Pr has interpreted the object 62 as a character part; however, this is rectified by the overlapping question performed by step C-3 in the subsequent treatment of the object 64 which is part of the character "6".

The process discussed relative to the Cl Pr is repeated for the next object 64. The steps are generally the same as discussed relative to object 62 which relates to the left hand portion of the "6" shown in the window 42 in FIG. 6; however, there is a difference as it relates to "overlapping." At step C-3, x, which is object 64 or the right half of the character "6", does overlap horizontally with the current part (object 62). Again the image location coordinates of each of the objects on the list 43 of objects are used for determining overlapping. From step C-4, x (object 64) is added to the current part (object 62) and is reclassified as the current part relative the next object 66 in the window 42. This means that object 62 which was previously classified as a character is now combined with the object 64, and these two objects are now classified as one character. It is conceivable that the object 62 might have been a small object, and it might have been classified as a comma or P-3, for example. However, because of the overlapping test associated with step C-3, the combination of objects 62 and 64 would probably be classified as P-1, or roughly the right size for a character. Note that while individual parts may be small, they can accumulate through the "overlapping" technique discussed to form a character-sized part. Commas and dots are just those objects which are small and isolated.

When the object 66 is processed by the Cl Pr, the combined objects 62 and 64 (FIG. 4) are used as the current part for the processing. From the iterations already discussed, the object 66 has the right size for it to be classified as a dot (P-2) as indicated by steps C-14 and C-15. In some situations, it is conceivable that because of poor printing, for example, the object 66 may not be large enough to be interpreted as a dot. In this situation, a very small dot might be classified as (P-5) at step C-18, which indicates that it is not one of the classes which is helpful in locating the image data which contains a monetary amount. When this occurs, the number "6" in the example being discussed is still the current part. The object 68 is then processed as previously described. Because object 68 is larger than a comma (step C-5), the Cl Pr proceeds to steps C-9 through C-13. At step C-10, the gap between x (object 68) and the current part (combined objects 62 and 64) is "large enough" to stand for a space where a decimal point might be found. Correspondingly, the horizontal distance between x (object 66) and the current part (combined objects 62 and 64) would be classified as a gap (P-4) at step C-10. The procedure for discerning a "comma" is essentially the same as that employed for processing a dot except that the physical size of the comma is interpreted at step C-16, with the new part comma (P-3) being classified at step C-17.

To review the processing of objects within the window 42 in FIG. 4, the objects 68 and 70 end up being classified as characters (P-1) by the techniques already explained. The object 72, which represents a symbol like a (+) on the adding machine tape, will end up being classified as a piece (P-5), which means that it is not one of the classes which is used in determining whether or not the image data ill the window 42 is indicative of a monetary amount. The remaining objects 74, 76, 78, 80, and 82 would be removed from the list 43 by the processing of the Cl Pr, at step C-1 thereof, because these objects touch the bottom of the window 42.

To review the processing of the objects in the window 42 shown in FIG. 4, the objects 58, 60, combined objects 62 and 64, 68, and 70 ended up being classified as characters (P-1). The horizontal distance between the characters (6 and 0), when large enough as indicated in the example described, is a gap (P-4). A dot is indicated by P-2, and a comma is indicated by P-3. After the image data in the window 42 has been classified as described, the window is moved to present new image data to be evaluated. The classification of the various objects into parts completes the first stage of the present method.

As alluded to earlier herein, the second stage of the method of this invention, relates to searching the list 43 of classified parts (P-1 through P-4) for the image data for a document 14 to find certain predetermined "sequences." These sequences are indicative of a monetary amount. In the embodiment described, the monetary amount is a "dollar" amount; however, these same principles may be extended to cover sequences which reflect monetary amounts of different countries.

For a "dollar" amount, there are two sequences of classes of parts (P-1 through P-4) which are looked for when the list 43 of classified parts is examined. The sequences are:

Seq. #1 character, dot, character, character;
or
Seq. #2 character, gap, character, character.

If a search of the list 43 of classified parts fails to find any of the two sequences mentioned, the search is terminated with a negative result. This means that a monetary amount probably does not exist for the image data which has been processed into classes. The process then proceeds to the next sequence or entry on the list 43. Sequence #1 is indicative of a dollar amount like $8.48, for example, in which the decimal point appears in the amount. Sequence #2 may be indicative of a similar monetary amount; however, for one reason or another, the decimal point may not have been interpreted by the Cl Pr, but instead, a gap between the "8" and the "4" in the amount was interpreted and classified as such, as discussed in an earlier example. Notice at this time, the characters are not interpreted as such, it's just that the sequence of parts fits a predetermined pattern for a monetary amount. In the example being described, any parts which are located to the right of the cents digit in the dollar amount of $8.48 are disregarded, while those to the left of this rightmost digit are considered characters in the monetary amount. For a monetary amount which is greater that a thousand dollars, for example, there would be commas between certain of the characters to reflect this usual monetary designation. When a sequence of parts indicates a monetary amount, this sequence may be so highlighted. This ends the second stage of this invention.

The third stage of this invention relates to checking upon the vertical regularity of the parts which have been classified by the Cl Pr to determine whether or not they conform to certain geometric criteria. In general, the heights of the character parts are examined to determine whether or not the heights are within expected norms or parameters for the machine characters being examined. This checking provides an additional degree of assurance that the characters classified as such, are in fact, characters. If the requirements are not met, the method terminates with a negative result for the "character parts" within the window 42. If the examination terminates with a positive result, it means that a machine printed dollar amount has been detected. When so detected, the coordinates of the top, bottom, left, and right sides of the smallest rectangle which encloses the machine printed dollar amount are recorded on the list 43. At this time, it should be noted that the character parts are in the right sequence for a monetary or dollar amount; however, the characters have not been identified as to what they represent. A subsequent character recognition operation would be performed on the character parts within the rectangle to ascertain the actual monetary amount.

Figure 5:
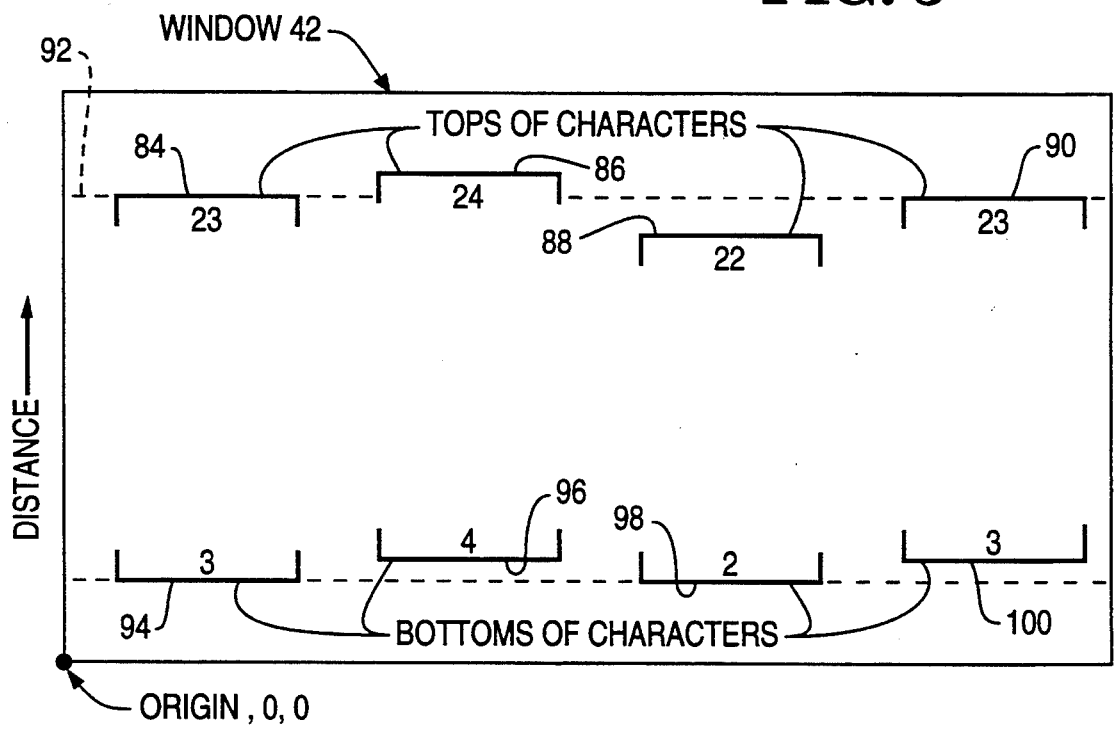
FIG. 5 is a diagram showing the tops and bottoms of characters which are used in checking on the regularity of characters within a window.

When a sequence, either Seq. #1 or Seq. #2 of classified parts is found in the second stage of this method, the third stage mentioned checks on the tops and bottoms of the classified characters (P-1) to make sure that the heights of the characters are within certain parameters. FIG. 5 is a schematic diagram used in indicating how this checking is performed.

Checking the heights of characters as reflected by the tops and bottoms of the characters is best explained in conjunction with FIG. 5. As stated earlier herein, the window 42 has certain coordinates which position the enclosed image data relative to the document 14. The window 42 also has an origin 0, 0 (for x and y coordinates) which is used as a reference point for the measurements to the tops and bottoms of the characters within the window 42. The equations used in stage 3 of this process are as follows:

$$\bar{t} = \frac{1}{N} \underset{\text{chars}}{\Sigma} \text{top} \qquad \text{Eq. 1}$$

$$\bar{b} = \frac{1}{N} \underset{\text{chars}}{\Sigma} \text{bottom} \qquad \text{Eq. 2}$$

$$T = \frac{1}{N} \underset{\text{chars}}{\Sigma} |\text{top} - \bar{t}| \qquad \text{Eq. 3}$$

$$B = \frac{1}{N} \sum_{\text{chars}} |\text{bottom} - \bar{b}| \qquad \text{Eq. 4}$$

$$T < D \qquad \text{Eq. 5}$$

$$B < D \qquad \text{Eq. 6}$$

Continuing with the example being discussed in FIG. 5, assume that the tops 84, 86, 88, and 90 of the characters are the ones to enter into the calculation to be described, and the distances of the tops mentioned are respectively, 23, 24, 22, and 23, units from the origin 0, 0 of the window 42, as shown in FIG. 5. Adding the four distances mentioned and dividing by N, which is four, produces an average $\bar{t}$=to 23; this average 23 is shown as dashed line 92. Adding the four distances 3, 4, 2, and 3 for the bottoms 94, 96, 98, and 100, respectively, and dividing by N, produces an average $\bar{b}$=to 3, as determined from Equation #2.

The next step in the process is determined from Equations #3 and #4. With Equation #3, it is the absolute variance by which the individual tops of the characters in FIG. 5 vary from the associated average (23), shown by the dashed line 92. In the example illustrated, the absolute distances from the average 23 (dashed line 92) for the tops 84, 86, 88, and 90 are respectively, are 0, 1, 1, and 0, producing a total of 2. With N in Equation #3 equal to 4, T=2/4 or 0.5. Equation #4 is handled in the same manner to arrive at B. The examples given have been made very simple to illustrate the techniques employed in the process.

Equations #5 and #6 relate to the regularity requirements of the system. The element D which appears in Equations #5 and #6 represents a predetermined resolution dependent threshold. For example, the resolution of the system in which this method is employed may represent a resolution of 200 pixels per inch. With such a resolution one might say that the tops and bottoms of the characters should not vary by more than a predetermined number of pixels, for example; this becomes the D in the equations mentioned in this paragraph. If these requirements are not met, the method terminates with a negative result. If the requirements are met, the method terminates with a positive result; this means that a machine printed dollar amount has been detected. The coordinates of the top, bottom, left and right sides of the monetary amount of the smallest rectangle which encloses the monetary amount are then used for this monetary amount.

Figure 6A:
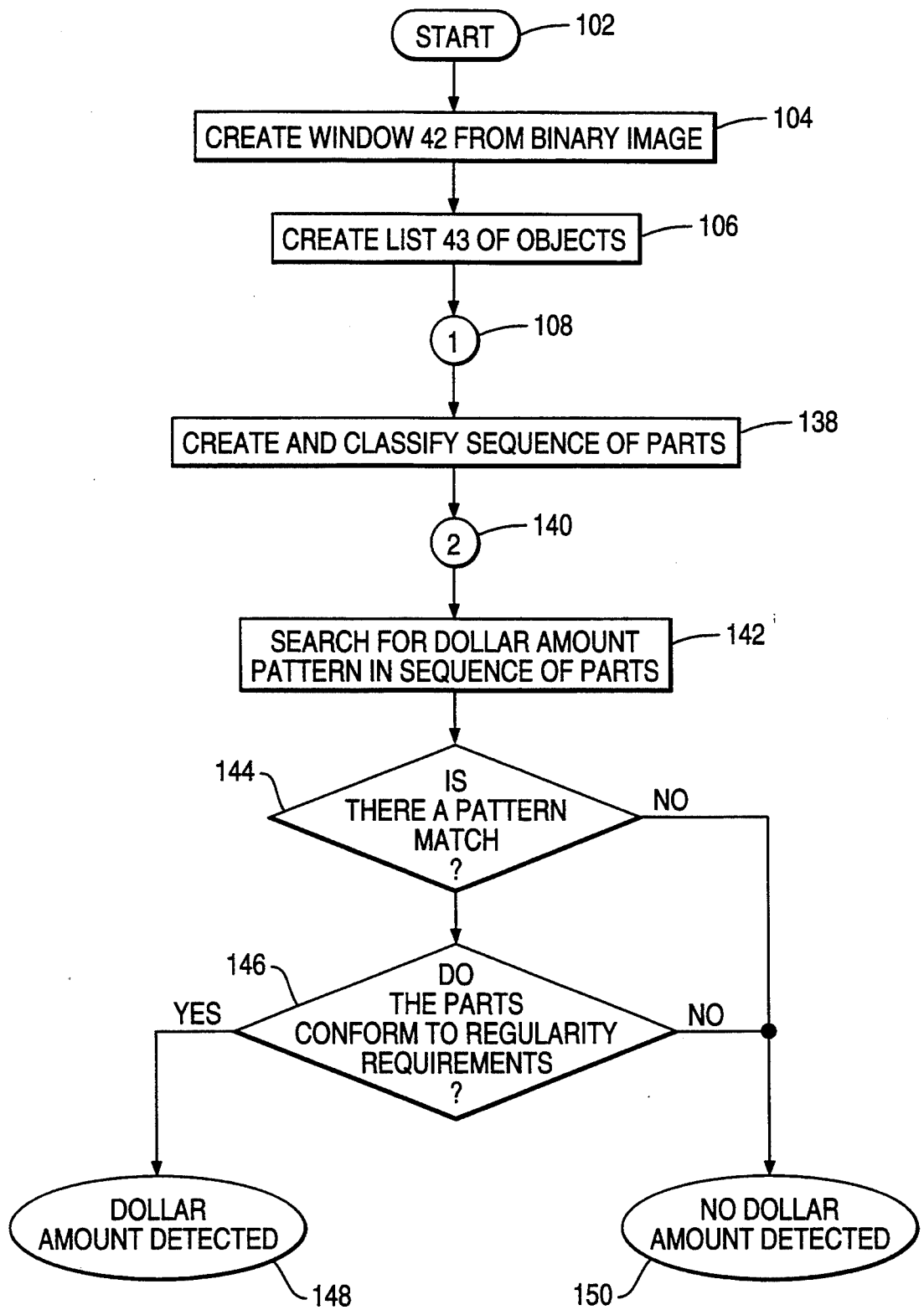
Figure 6B:
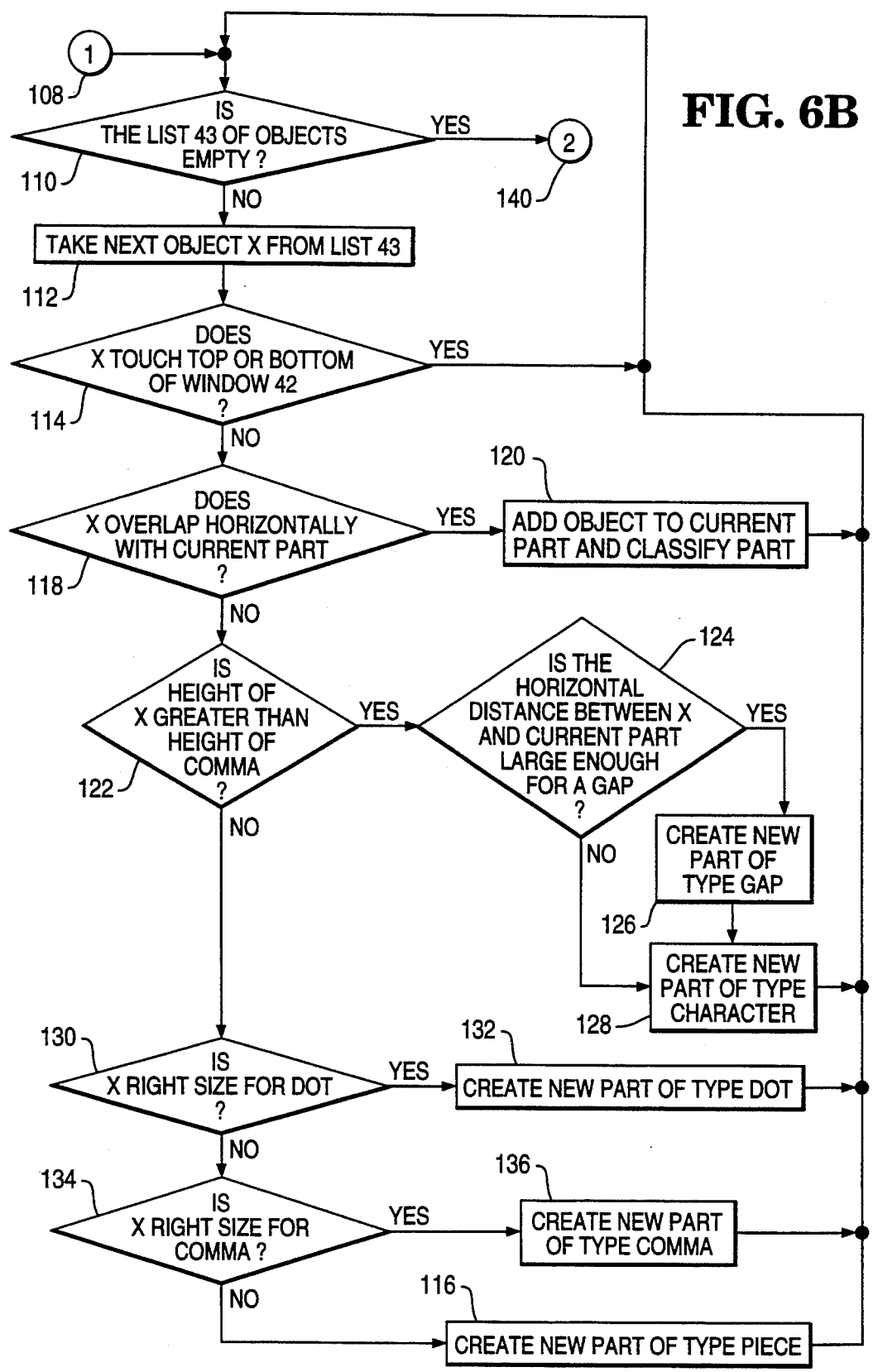

FIGS. 6-1 and 6-2, taken together, show the general steps associated with the method of this invention. The various enclosing figures, like ellipses and rectangles, for example, will be referred to as steps. The method starts at step 102. At step 104, the window 42 is created, and at step 106, a list 43 of objects is created. The processing of the objects included in the list 43 begins at step 108 which is also shown on FIG. 6-2.

The processing of objects (FIG. 6-2) begins at step 110 at which the question "Is the list 43 of objects empty?" is asked. Assume that the processing of objects has just begun, and there are objects to be processed as indicated by step 112 at which the next object in the list is taken. At step 114, the question "Does x touch the top or bottom of the window 42?" is asked. If the answer is "Yes", the method proceeds to step 116 where the object becomes a new part of type piece (P-5). If the object x does not touch the top or bottom of the window 42, the method proceeds to step 118 where the question "Does x overlap horizontally with the current part?" is asked, as discussed in relation to the objects 62 and 64 in FIG. 4. If "yes", the object is added to the current part as indicated by step 120.

Continuing with the method from step 114, if x does not overlap horizontally with the current part, the method proceeds to step 122 (FIG. 6-2). At step 122, the question, "Is the height of x greater than the height of a comma?" If the answer is "yes", the method proceeds to step 124 where the horizontal distance between x and the current part is examined to determine whether or not it is large enough for a gap as discussed in relation to the distance between objects 64 and 68 (FIG. 4). If the answer from step 124 is "yes", a new part of type gap (P-4) is created at step 126. If the answer from step 124 is "no", a new part of type character (P-1) is created at step 128.

Referring back to step 122 in FIG. 6-2, if the height of x is not greater than the height of a comma, the method proceeds to step 130 (FIG. 6-2). At step 130, the question "Is x the right size for a dot?" is examined. If the answer is "yes", a new part of type dot (P-2) is created at step 132. If the answer is "no" at step 130, the method proceeds to step 134 where the question "Is x the right size for a comma?" is determined. If the answer is "yes", the method proceeds to step 136 where a new part of type comma (P-3) is created. If at step 134, the answer is "no", the method proceeds to step 116 where a new part of type piece (P-5) is created; this classification essentially means that it is not one of the P-1 through P-4 classes.

The steps which are shown on FIG. 6-2 are represented by the general step 138 shown in FIG. 6-1, which step relates to the creating and classifying of parts. When the list of objects is empty (step 110 in FIG. 6-2), the method proceeds to step 140 also shown on FIG. 6-1. From step 140, the method proceeds to step 142 at which a search for a dollar amount pattern in the sequence of parts P-1 through P-5 is performed. It should be recalled that the pattern matches or sequences are:

Seq. #1 character, dot, character, character;

or

Seq. #2 character, gap, character, character.

If there is a pattern match at step 144, the method proceeds to step 146 at which the parts are examined to determine whether or not they conform to certain predetermined regularity requirements. This examination is performed with the equations Eq. 1 through Eq. 6 discussed earlier herein. If the parts are conforming, meaning they are of the appropriate size, the method proceeds to step 148 which indicates that the parts are such as to indicate that a dollar amount has been detected. If the parts do not conform at step 146, it means that no dollar amount has been detected (step 150) for that particular window 42.

After step 146 in FIG. 6-1 is completed, the window 42 (FIG. 3) is moved to include a new portion of the image, and the image data in the new window is examined as discussed in relation to FIGS. 6-1 and 6-2.

What is claimed is:

1. A machine method for locating a monetary amount in a binary bit mapped image of a document comprising, the steps of:

(a) positioning a window of a predetermined size over a portion of said binary bit mapped image, with a binary 1 representing a black pixel and a binary 0 representing a white pixel;

(b) generating a list of objects within said window, with an object defined as a set of contiguous black pixels, with contiguity defined as a first black pixel and at least a second black pixel in one of eight positions surrounding said first black pixel; said generating step further comprising:

(b-1) determining if any of said objects touch a top or bottom of said window; and (b-2) excluding objects that are determined in step (b-1) to be touching a top or bottom of said window;

(c) processing said objects according to predetermined criteria to generate classified parts and determining whether or not the classified parts fit into a pattern indicative of a monetary amount without performing character recognition on the classified parts; and (d) using said pattern indicative of a monetary amount, when found, to indicate the presence of a monetary amount if the associated classified parts conform to certain geometric criteria relating to vertical regularity of the classified parts.

2. The method as claimed in claim 1 in which said using step (d) comprises:

(d-1) using a pattern of: character, dot, character, character.

3. The method as claimed in claim 1 in which said using step (d) comprises:

(d-1) using a pattern of: character, gap, character, character.

4. A machine method for locating a monetary amount in a binary bit mapped image of a document comprising, the steps of:

(a) positioning a window of a predetermined size over a portion of said binary bit mapped image, with a binary 1 representing a black pixel and a binary 0 representing a white pixel;

(b) generating a list of objects within said window, with an object defined as a set of contiguous black pixels, with contiguity defined as a first black pixel and at least a second black pixel in one of eight positions surrounding said first black pixel; said generating step further comprising:

(b-1) determining if any of said objects touch a top or bottom of said window; and (b-2) excluding objects that are determined in step (b-1) to be touching a top or bottom of said window;

(c) classifying said objects into classified parts without performing character recognition on the classified parts, with the classifying being performed according to five predetermined size criteria as follows: character, dot, comma, gap, and piece, with piece defined as an object not fitting the prior four size criteria named;

(d) examining said classified parts to determine whether or not the classified parts fit into a certain sequence which is indicative of a monetary amount, with said examining step including checking overlapping parts of objects classified as characters to determine whether or not the overlapping parts should be classified as one single said character;

(e) examining said classified parts when said certain sequence is found in step (d) to determine whether or not the sizes of said classified parts are within predetermined parameters relating to vertical regularity of the classified parts to be indicative of a monetary amount;

(f) locating the monitary amount.

5. The method as claimed in claim 4 in which said examining step (d) is effected by:

(d-1) examining said classified parts to determine whether or not the classified parts fit into a sequence of: character, dot, character, character.

6. The method as claimed in claim 4 in which said examining step (d) is effected by:

(d-1) examining said classified parts to determine whether or not the classified parts fit into a sequence of: character, gap, character, character.

7. The method as claimed in claim 4 in which said positioning step (a) is effected by:

(a-1) dimensioning said window so that it is unlikely that it will accommodate more than one printed monetary amount.

8. The method as claimed in claim 7 in which said examining step (e) is effected by:

(e-1) measuring the distances between the tops and bottoms of the classified parts classified as characters from a coordinate position within said window.

* * * * *